(12) United States Patent
Malmberg et al.

(10) Patent No.: US 10,022,704 B2
(45) Date of Patent: Jul. 17, 2018

(54) SCR CATALYST

(71) Applicant: UMICORE AG & CO. KG, Hanau-Wolfgang (DE)

(72) Inventors: Stephan Malmberg, Frankfurt (DE); Nicola Soeger, Nidderau (DE); Yvonne Demel, Altenstadt (DE); Gerald Jeske, Neuberg (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 16 days.

(21) Appl. No.: 15/035,640

(22) PCT Filed: Nov. 19, 2014

(86) PCT No.: PCT/EP2014/075048
§ 371 (c)(1),
(2) Date: May 10, 2016

(87) PCT Pub. No.: WO2015/075083
PCT Pub. Date: May 28, 2015

(65) Prior Publication Data
US 2016/0288094 A1    Oct. 6, 2016

(30) Foreign Application Priority Data
Nov. 25, 2013 (EP) .................... 13194249

(51) Int. Cl.
| B01J 23/30 | (2006.01) |
|---|---|
| B01J 35/00 | (2006.01) |
| B01J 35/04 | (2006.01) |
| B01J 35/10 | (2006.01) |
| B01D 53/94 | (2006.01) |
| B01J 37/02 | (2006.01) |
| B01J 37/08 | (2006.01) |
| B01J 21/06 | (2006.01) |

(52) U.S. Cl.
CPC .......... *B01J 23/30* (2013.01); *B01D 53/9418* (2013.01); *B01D 53/9477* (2013.01); *B01J 35/0006* (2013.01); *B01J 35/04* (2013.01); *B01J 35/1014* (2013.01); *B01J 35/1019* (2013.01); *B01J 37/0236* (2013.01); *B01J 37/0244* (2013.01); *B01J 37/08* (2013.01); *B01D 2251/208* (2013.01); *B01D 2251/2062* (2013.01); *B01D 2255/104* (2013.01); *B01D 2255/206* (2013.01); *B01D 2255/207* (2013.01); *B01D 2255/2065* (2013.01); *B01D 2255/2073* (2013.01); *B01D 2255/2096* (2013.01); *B01D 2255/20707* (2013.01); *B01D 2255/20723* (2013.01); *B01D 2255/20738* (2013.01); *B01D 2255/20769* (2013.01); *B01D 2255/20776* (2013.01); *B01D 2255/30* (2013.01); *B01D 2255/40* (2013.01); *B01D 2255/9022* (2013.01); *B01D 2255/9155* (2013.01); *B01D 2258/012* (2013.01); *B01J 21/063* (2013.01); *Y02T 10/24* (2013.01)

(58) Field of Classification Search
CPC ........ B01J 23/30; B01J 37/08; B01J 37/0236; B01J 37/0244; B01J 35/04; B01J 35/0006; B01J 35/1019; B01J 35/1014; B01J 21/063; Y02T 10/24; B01D 53/9418; B01D 53/9477; B01D 2255/9155; B01D 2255/40; B01D 2255/20723; B01D 2255/206; B01D 2255/30; B01D 2255/2065; B01D 2255/9022; B01D 2255/20776; B01D 2255/207; B01D 2255/2096; B01D 2255/104; B01D 2255/20769; B01D 2251/2062; B01D 2255/2073; B01D 2258/012; B01D 2251/208; B01D 2255/20707; B01D 2255/20733
See application file for complete search history.

(56) References Cited

U.S. PATENT DOCUMENTS

| 2002/0025905 A1* | 2/2002 | Harris ................ B01D 53/9431 502/309 |
|---|---|---|
| 2012/0087835 A1 | 4/2012 | Trefzger et al. |

(Continued)

FOREIGN PATENT DOCUMENTS

| DE | 102012213639 A1 | 2/2013 |
|---|---|---|
| EP | 0345695 A2 | 12/1989 |
| EP | 0385164 A2 | 9/1990 |

(Continued)

OTHER PUBLICATIONS

Written Opinion of the International Searching Authority for PCT/EP2014/073256 dated Apr. 4, 2016 (12 pages).

(Continued)

*Primary Examiner* — Anthony J Zimmer
(74) *Attorney, Agent, or Firm* — Smith, Gambrell & Russell, LLP

(57) ABSTRACT

The invention relates to a catalyst comprising at least two catalytically active layers, A and B, wherein A contains a carrier oxide and components A1 and A2, and B contains a carrier oxide and components B1, B2, and B3, wherein A1, A2, and B1 to B3 are defined as disclosed in claim 1. The proportion of component A1 in layer A is thereby greater than the proportion of component B1 in layer B, wherein the proportion of layer A with respect to the total weight of layers A and B, is greater than the proportion of layer B. The invention further relates to a method for reducing nitrogen oxides in exhaust gases of lean-burn internal combustion engines and to an exhaust gas cleaning system.

27 Claims, No Drawings

(56) References Cited

U.S. PATENT DOCUMENTS

2013/0205743 A1    8/2013  Sobolevskiy
2014/0157763 A1    6/2014  Chandler et al.

FOREIGN PATENT DOCUMENTS

WO         89/03366 A1    4/1989
WO      2011/013006 A2    2/2011

OTHER PUBLICATIONS

International Search Report for PCT/EP2014/075048, dated Feb. 2, 2015 in English and German Language.
SAE Technical Paper Series 950809, Feb. 27-Mar. 2, 1995, pp. 121-130. Development of New Concept Three-Way Catalyst for Automotive Lean-Burn Engines. N. Miyoshi, et al.

* cited by examiner

SCR CATALYST

The present invention relates to an SCR catalyst containing an oxide of vanadium.

The exhaust gases from motor vehicles which are fitted with lean-burn internal combustion engines, such as diesel engines, contain carbon monoxide (CO) and nitrogen oxide ($NO_x$), as well as components which result from the incomplete combustion of the fuel in the combustion chamber of the cylinder. In addition to residual hydrocarbons (HC), which are usually also predominantly present in gaseous form, these include particle emissions, also referred to as "diesel soot" or "soot particles." These are complex agglomerates from predominantly carbonaceous particulate matter and an adhering liquid phase, which usually preponderantly comprises longer-chained hydrocarbon condensates. The liquid phase adhering to the solid components is also referred to as "Soluble Organic Fraction SOF" or "Volatile Organic Fraction VOF."

To clean these exhaust gases, the aforementioned components must be converted to harmless compounds as completely as possible. This is only possible with the use of suitable catalysts.

In this way, carbon monoxide (CO), gaseous hydrocarbons (HC) and, if applicable, organic agglomerates adhering to the soot particles (so-called "Volatile Organic Fraction" VOF) can be oxidatively removed using oxidation catalysts.

Particle filters are used to remove particle emissions. As a rule, particle filters are wall flow filter substrates, i.e., honeycomb bodies with two-way, gas-tight inflow and outlet channels, which are bounded and separated from each other by porous walls. The particle-containing exhaust gases which stream into the inflow channels are forced to pass through the porous wall by a gas-tight sealing plug located on the outlet side and escape again from the wall flow filter substrate through the outlet channels sealed on the inflow side. In so doing, diesel soot is filtered out of the exhaust gas.

The use of nitrogen oxide storage catalysts offers an option for removing the nitrogen oxides. Their cleaning action is based on the fact that, in the lean operating phase of the engine, the nitrogen oxides from the storage material in the storage catalyst are predominantly stored in the form of nitrates and broken down again in a subsequent short rich operating phase of the engine, and the nitrogen oxides which are thereby released are converted with the reducing exhaust components in the storage catalyst to nitrogen, carbon dioxide, and water. This operating principle is described in, for example, the SAE document SAE 950809.

Another known method for removing nitrogen oxides from exhaust gases in the presence of oxygen is the selective catalytic reduction method (SCR process; Selective Catalytic Reduction) using ammonia on a suitable catalyst, the SCR catalyst. In this method, the nitrogen oxides to be removed from the exhaust gas are converted to nitrogen and water using ammonia. The ammonia, which is used as a reducing agent, can be produced in the exhaust system as a secondary emission or made available in the exhaust gas system and subsequent hydrolysis by injecting a precursor from which ammonia can be formed, such as urea, ammonium carbamate, or ammonium formate.

To perform the last-mentioned variant of the SCR method, a source for the provision of the reducing agent—an injection device for metering the reducing agent into the exhaust gas as required—and an SCR catalyst arranged in the flow path of the exhaust gas are needed.

Mixed oxides, for example, which are based in particular on titanium dioxide and/or oxides of vanadium such as vanadium pentoxide, and which can contain other oxides, such as those of silicon, molybdenum, manganese, tungsten, and others, can be used as SCR catalysts. These catalysts are described in detail in the literature; see, for example, WO 89/03366 A1, EP 0 345 695 A2, EP 0 385 164 A2, WO 2011/013006 A2, and US 2013/205743.

Because internal combustion engines in motor vehicles are operated in transient driving cycles, the SCR catalyst must also ensure the highest possible nitrogen oxide conversions with good selectivity, even under widely varying operating conditions. Therefore, a complete and selective conversion of the nitrogen oxide quantities which occur should also be ensured at low temperatures, just as they are at high temperatures, such as arise, for example, at full throttle.

However, previous prior art does not allow vanadium SCR catalysts to be optimized simultaneously with respect to low-temperature activity (T<250° C.) and high-temperature selectivity (T≥500° C.). An improvement in low-temperature activity is always linked to deficits in high-temperature selectivity and vice versa.

However, there is increased market demand for just this type of catalyst. Therefore, the object of the present invention is to provide vanadium SCR catalysts which are distinguished by good low-temperature activity with simultaneously greater high-temperature selectivity.

This object is accomplished by a catalyst for the selective reduction of nitrogen oxides comprising two catalytically active layers A and B, wherein A contains a carrier oxide and the components A1 and A2, and B contains a carrier oxide and the components B1, B2, and B3, wherein A1 and B1 stand for at least one oxide of vanadium, A2 and B2 for at least one oxide of tungsten, and B3 for at least one oxide of silicon, characterized in that the proportion of component A1 in layer A in wt % with respect to the total weight of layer A is greater than the proportion of component B1 in layer B in wt % with respect to the total weight of layer B, and the proportion of layer A in wt % with respect to the total weight of layers A and B is greater than the proportion of layer B.

In one embodiment of the present invention, in addition to components A1 and A2, layer A also contains a component A3, wherein A3 stands for at least one oxide of silicon and wherein the proportion of component A3 in layer A in wt % with respect to the total weight of layer A is smaller than the proportion of component B3 in layer B in wt % with respect to the total weight of layer B.

Depending on the operating status of the catalyst according to the invention, components A1 to A3 and B1 to B3 can be present in different oxidic forms. The parameters which determine the respective oxidic forms include, for example, the concentration of the individual components, the temperature, and the oxygen concentration to which the catalyst is exposed. However, the production process of the catalyst according to the invention can also have an impact.

As a rule, vanadium is present as vanadium pentoxide, tungsten as tungsten trioxide, and silicon as silicon dioxide. Depending upon the oxygen concentration, vanadium, tungsten and silicon can, however, also be present in higher or lower oxidation states. Furthermore, it is also possible that all oxidic components of layer A and/or all oxidic components of layer B form a solid solution in which oxides of the individual elements can no longer be distinguished. However, this is, at most, of lesser importance to the effectiveness as an SCR catalyst and has no significant influence on catalytic activity.

Furthermore, the person skilled in the art is able to determine the present form of the catalysts according to the invention by means of appropriate analytical methods.

In one embodiment of the catalyst according to the invention, it has at least two catalytically active layers A and B, wherein A contains a carrier oxide, vanadium pentoxide as component A1, and tungsten trioxide as component A2, and B contains a carrier oxide, vanadium pentoxide as component B1, tungsten trioxide as component B2, and silicon dioxide as component B3, characterized in that the proportion of vanadium pentoxide in layer A in wt % with respect to the total weight of layer A is greater than the proportion of vanadium pentoxide in layer B in wt % with respect to the total weight of layer B, and the proportion of layer A in wt % with respect to the total weight of layers A and B is greater than the proportion of layer B.

In a further embodiment of the catalyst according to the invention, the proportion of component A2 in layer A and of component B2 in layer B in wt % respectively, with respect to the total weight of layer A or B, is equal, or the proportion of component A2 in layer A in wt % with respect to the total weight of layer A is smaller than the proportion of component B2 in layer B in wt % with respect to the total weight of layer B.

Layers A and B can, independently of one another, contain additional components A4 or B4, wherein A4 stands for one or more metal oxides which are selected from the series consisting of oxides of copper, iron, manganese, molybdenum, antimony, niobium, silver, palladium, platinum, and rare earth elements, and B4, independently of A4, stands for one or more metal oxides which are selected from the series consisting of oxides of copper, iron, manganese, molybdenum, antimony, niobium, silver, and rare earth elements.

As is the case with components A1 to A3 and B1 to B3, the oxidic form of components A4 and B4 can also differ and depends, as described above, upon the operating status of the catalyst according to the invention and upon its production process. Furthermore, metals such as silver, palladium, and platinum can, depending upon the operating status, also be present in metallic form. For the purposes of the present invention, the wording selected above—oxides of silver, platinum, and palladium—also includes, therefore, the metals themselves.

Insofar as the catalyst according to the invention contains components A4 and B4, and they stand for an oxide of a rare earth element, then, in particular, the proportion of rare earth oxide in layer A in wt % with respect to the total weight of layer A is smaller than the proportion of rare earth oxide in layer B in wt % with respect to the total weight of layer B.

Preferred rare earth elements are lanthanum, cerium, praseodymium, neodymium, samarium, gadolinium, terbium, dysprosium, erbium, and yttrium.

Insofar as the catalyst according to the invention contains components A4 and B4, and they stand for an oxide of copper, iron, manganese, molybdenum, niobium, or silver, then, in particular, the proportion of oxides of copper, iron, manganese, molybdenum, niobium, or silver in layer A in wt % with respect to the total weight of layer A is larger than the proportion of oxides of copper, iron, manganese, molybdenum, antimony, niobium, or silver in layer B in wt % with respect to the total weight of layer B.

In one embodiment of the catalyst according to the invention, it contains component A4, but not component B4.

In this case, the proportion of component A4 with respect to the total weight of layer A amounts to 0.1 to 15 wt %, wherein, in the case of silver, platinum, and palladium, the proportion is calculated as a metal in each case, and, in the case of the other components, the proportion is calculated as an oxide in each case, namely, as $CuO$, $Fe_2O_3$, $MnO$, $MoO_3$, $Sb_2O_5$, $Nb_2O_5$, $CeO_2$, or $Er_2O_3$.

Platinum can be used in layer A to particular advantage. Due to its efficacy at catalytic oxidation, platinum is able to oxidize unreacted ammonia via the SCR reaction and thereby prevent its release into the environment. Other active oxidation oxides, for example, those of copper, manganese, and silver, can exhibit this effect.

In one embodiment of the invention, the proportion of component A1 calculated as vanadium pentoxide amounts to 1.5 to 5 wt %—in particular, 2 to 4 wt %—with respect to the total weight of layer A.

In a further embodiment of the invention, the proportion of component B1 calculated as vanadium pentoxide amounts to 1 to 4 wt %—in particular, 1.5 to 3.5 wt %—with respect to the total weight of layer B.

In a further embodiment of the invention, the proportion of component A2 with respect to the total weight of layer A and the proportion of component B2 with respect to the total weight of layer B are equal. In this case, the proportion calculated as tungsten trioxide amounts to, in particular, 3 to 12—preferably 4.5 to 10 wt %.

In the event that the proportion of component A2 with respect to the total weight of layer A is smaller than the proportion of component B2 with respect to the total weight of layer B, then this, calculated as tungsten trioxide, amounts, in particular, to 3 to 5.5—preferably 4.5 to 5 wt %. The proportion of component B2 with respect to the total weight of layer B then amounts, in particular, to 4.5 to 12—preferably 5 to 10 wt %.

The proportion of component B3 with respect to the total weight of layer B and calculated as silicon dioxide amounts, in particular, to 3 to 12—preferably 3.5 to 10 wt %. The proportion of component A3 with respect to the total weight of layer A and calculated as silicon dioxide preferably amounts to 0 to 5 wt %. Insofar as component A3 is present, it is especially preferable that its proportion with respect to the total weight of layer A and calculated as silicon dioxide amounts to 1 to 5 wt %.

Insofar as components A4 or B4 are present, their proportion with respect to the total weight of layer A or layer B amounts, in particular, to 0.1 to 15 wt %. These figures, with the exception of silver, platinum, and palladium, whose proportion is calculated as a metal in each case, are calculated on the proportion of the oxides $CuO$, $Fe_2O_3$, $MnO$, $MoO_3$, $Sb_2O_5$, $Nb_2O_5$, $CeO_2$, $Er_2O_3$, etc.

In a further embodiment of the present invention, the proportion of component A1 calculated as vanadium pentoxide amounts to 1.5 to 5 wt % with respect to the total weight of layer A, and the proportion of component B1 calculated as vanadium pentoxide amounts to 1 to 4 wt % with respect to the total weight of layer B, the proportion of component A2 with respect to the total weight of layer A and the proportion of component B2 with respect to the total weight of layer B are equal and, calculated as tungsten trioxide, amount to 3 to 12 wt %, or the proportion of component A2 with respect to the total weight of layer A is smaller than the proportion of component B2 with respect to the total weight of layer B and, calculated as tungsten trioxide, amounts to 3 to 5.5 wt %, wherein the proportion of component B2 with respect to the total weight of layer B then amounts to 4.5 to 12 wt %, and the proportion of component B3 with respect to the total weight of layer B and calculated as silicon dioxide amounts to 3 to 12 wt %, wherein component A3 is not present or its proportion with respect to the total weight of layer A and calculated as silicon dioxide amounts to 1 to 5 wt %.

In a further embodiment of the present invention, the proportion of component A1, calculated as vanadium pentoxide, amounts to 2 to 4 wt % with respect to the total weight of layer A, and the proportion of component B1, calculated as vanadium pentoxide, amounts to 1.5 to 3.5 wt % with respect to the total weight of layer B, the proportion of component A2 with respect to the total weight of layer A and the proportion of component B2 with respect to the total weight of layer B are equal and, calculated as tungsten trioxide, amount to 4.5 to 10 wt %, or the proportion of component A2, with respect to the total weight of layer A, is smaller than the proportion of component B2, with respect to the total weight of layer B, and, calculated as tungsten trioxide, amounts to 4.5 to 5 wt %, wherein the proportion of component B2 with respect to the total weight of layer B then amounts to 5 to 10 wt %, and the proportion of component B3 with respect to the total weight of layer B and calculated as silicon dioxide amounts to 3.5 to 10 wt %, wherein component A3 is not present, or its proportion with respect to the total weight of layer A and calculated as silicon dioxide amounts to 1 to 5 wt %.

In embodiments of the catalyst according to the invention, the carrier oxide in layer A and/or B is titanium dioxide, zirconium dioxide, or aluminum oxide. In particular, the carrier oxide in layer A and B is titanium dioxide. The preferred titanium dioxide is present at a minimum of 95% in the anatase modification and at a maximum of 5% in the rutile modification. Its BET surface area is, in particular, larger than 80 m$^2$/g and amounts to, for example, 80 to 250 m$^2$/g.

The proportion of carrier oxide in wt % with respect to the respective layer is derived simply as the difference in the sum of the proportions of the remaining components, for example, A1, A2, A3, and A4 or B1, B2, B3, and B4 and 100.

According to the invention, the proportion of layer A in wt % with respect to the total weight of layers A and B is greater than the proportion of layer B.

In embodiments of the present invention, the proportion of layer B amounts to 12.5 to 25% with respect to the total weight of layers A and B.

In particular, layer A is used in quantities of 100 to 220—preferably 120 to 210 g/l—and layer B is used in quantities of 14 to 75 g/l with respect to the volume of the carrier substrate in each case.

Layers A and B of the catalyst according to the invention are advantageously applied to a catalytically inert supporting body made from ceramic or metallic material, which has a first end a, a second end b, and a length L, which extends between ends a and b. Thereby, the catalytically inert supporting body can be a throughput honeycomb body or a wall flow filter. Insofar as a wall flow filter is used as a catalytically inert supporting body, the catalyst according to the invention can be used as a diesel particle filter provided with an SCR-active coating.

The arrangement of layers A and B on the catalytically inert supporting body can differ. In particular, however, they are arranged so that when used as intended, the catalyst according to the invention can be installed in the motor vehicle so that layer B comes into contact with the exhaust gas to be cleaned before layer A.

In this way, for example, layer A is directly applied to the inert supporting body across its entire length, and layer B is applied to layer A and completely covers it on the exhaust gas side.

In a further embodiment, layer A, originating from end a of the catalytically inert supporting body, can be applied to a length La, and layer B, originating from end b of the catalytically inert supporting body, can be applied to a length Lb, wherein La amounts to 50 to 75% and Lb amounts to 25 to 50% of the length L, and La+Lb=L. In a further embodiment, layer A and layer B can be applied to two different catalytically inert supporting bodies arranged in succession. In this case, with the intended use of the catalyst according to the invention, the layer B catalytically inert supporting body is found, in particular, on the inflow side of the layer A catalytically inert supporting body.

Ultimately, it is also possible to not apply layers A and B to a catalytically inert supporting body, but rather to form layer A as an extruded supporting body upon which layer B is applied in the form of a coating.

Layers A and B are applied to the catalytically inert supporting body in accordance with customary dip coating methods or pump and suck coating methods with subsequent thermal post-treatment (calcination and reduction using forming gas or hydrogen, if applicable). These methods are sufficiently known from the prior art.

The catalyst according to the invention is particularly well-suited to the reduction of nitrogen oxides in exhaust gases of lean-burn internal combustion engines, in particular, diesel engines.

The present invention, therefore, also relates to a method for the reduction of nitrogen oxides in exhaust gases of lean-burn internal combustion engines, comprising the following method steps:

adding a reducing agent to the exhaust gas containing nitrogen oxides and passing the resulting mixture from the exhaust gas containing nitrogen oxides and reducing agent over a catalyst according to the invention, wherein the catalyst is arranged such that the mixture of exhaust gas containing nitrogen oxides and reducing agent comes into contact with layer B first.

As a reducing agent, ammonia comes especially into consideration, whereby, with particular advantage, not ammonia itself, but an ammonia precursor—in particular, urea—is added to the nitrogen oxide containing exhaust gas.

However, hydrocarbons can also be used as the reducing agent (the so-called HC-deNOx process), wherein the hydrocarbons can be added to the exhaust gas containing nitrogen oxides, or wherein the hydrocarbons can be formed in the exhaust gas stream (the so-called passive HC-deNOx process). The various processes or the various reducing agents are known to the person skilled in the art and are described in detail in the literature.

In particular, the catalyst according to the invention is used as a component of an exhaust gas cleaning system which, for example, comprises an oxidation catalyst and a diesel particle filter arranged on the inflow side, in addition to the catalyst according to the invention. The catalyst according to the invention can, thereby, also be present as a coating on the diesel particle filter.

The present invention, therefore, also concerns an exhaust gas cleaning system for treating diesel exhaust gas which, in the direction of flow of the exhaust gas, comprises
an oxidation catalyst,
a diesel particle filter, and
a catalyst according to the invention or
an oxidation catalyst and
a diesel particle filter on which a catalyst according to the invention is present as a coating,
wherein the catalyst according to the invention is arranged such that the exhaust gas containing nitrogen oxides comes into contact with layer B first.

Oxidation catalysts and diesel particle filters suitable for the exhaust gas cleaning system are known to the person skilled in the art and are available on the market.

As a rule, the exhaust gas cleaning system according to the invention comprises a device for dosing ammonia, which is arranged on the inflow side of the catalyst according to the invention, or a compound from which ammonia is formed, for example, urea. The present invention also concerns a method for the reduction of nitrogen oxides in exhaust gases of lean-burn internal combustion engines, in particular, diesel engines, which is characterized in that the exhaust gas is channeled through an exhaust gas cleaning system according to the invention.

EXAMPLES 1 TO 8

Production of Catalyst Powders:

A) Catalyst Powder A of the Composition
87.8 wt % $TiO_2$ as carrier, 2.2 wt % $V_2O_5$, and 10 wt % $WO_3$; was produced as follows: Commercially available titanium dioxide (anatase) in powder form was placed in a container. Then, an aqueous solution of ammonium metatungstate and ammonium metavanadate dissolved in oxalic acid was slowly added in the appropriate quantity under constant mixing. The powder thus obtained was dried at 110° C. and then calcined at 600° C. for 6 hours.

B) Catalyst Powder B of the Composition
87.8 wt % $TiO_2$ as carrier, 2.2 wt % $V_2O_5$, and 10 wt % $WO_3$; was produced as follows: Commercially available titanium dioxide (anatase) in powder form doped with 10 wt % tungsten oxide was placed in a container. Then, ammonium metavanadate dissolved in oxalic acid was slowly added in the appropriate quantity under constant mixing. The powder thus obtained was dried at 110° C. and then calcined at 600° C. for 6 hours.

C) Catalyst Powder C of the Composition
79.4 wt % $TiO_2$ as carrier, 1.8 wt % $V_2O_5$, 10 wt % $WO_3$, and 8.8 wt % $SiO_2$ was produced as follows:
Commercially available titanium dioxide (anatase) in powder form doped with 10 wt % $SiO_2$ was placed in a container. Then, an aqueous solution of ammonium metatungstate and ammonium metavanadate dissolved in oxalic acid was slowly added in the appropriate quantity under constant mixing. The powder thus obtained was dried at 110° C. and then calcined at 600° C. for 6 hours.

D) Catalyst Powder D of the Composition
78.5 wt % $TiO_2$ as carrier, 1.8 wt % $V_2O_5$, 10 wt % $WO_3$, and 9.7 wt % $SiO_2$ was produced as follows:
Commercially available titanium dioxide (anatase) in powder form doped with 10 wt % $SiO_2$ and 9 wt % tungsten oxide was placed in a container. Then, ammonium metavanadate dissolved in oxalic acid was slowly added in the appropriate quantity under constant mixing. The powder thus obtained was dried at 110° C. and then calcined at 600° C. for 6 hours.

EXAMPLE 1 a) To produce a catalyst according to the invention, catalyst powder A was slurried in water and coated in the usual way along the entire length of a commercial flow substrate. It was then dried at 110° C. and calcined at 600° C. for 6 hours. The washcoat load amounted to 210 g/l b) Then, catalyst powder C was slurried in water and coated in the usual way along the entire length of the flow substrate obtained in accordance with the above step a) and coated with catalyst powder A. It was again dried at 110° C. and calcined at 600° C. for 6 hours. The washcoat load of the second layer amounted to 70 g/l The catalyst according to the invention thus obtained is referred to below as K1.

EXAMPLE 2

Catalyst powder D was slurried in water and coated in the usual way along the entire length of the flow substrate obtained in accordance with Example 1a) and coated with catalyst powder A. It was again dried at 110° C. and calcined at 600° C. for 6 hours. The washcoat load of the second layer amounted to 70 g/l The catalyst according to the invention thus obtained is referred to below as K2.

EXAMPLE 3 a) To produce a catalyst according to the invention, catalyst powder B was slurried in water and coated in the usual way along the entire length of a commercial flow substrate. It was then dried at 110° C. and calcined at 600° C. for 6 hours. The washcoat load amounted to 210 g/l.

b) Then, catalyst powder C was slurried in water and coated in the usual way along the entire length of the flow substrate obtained in accordance with the above step a) and coated with catalyst powder B. It was again dried at 110° C. and calcined at 600° C. for 6 hours. The washcoat load of the second layer amounted to 70 g/l.

The catalyst according to the invention thus obtained is referred to below as K3.

EXAMPLE 4

Catalyst powder D was slurried in water and coated in the usual way along the entire length of the flow substrate obtained in accordance with Example 3a) and coated with catalyst powder B. It was again dried at 110° C. and calcined at 600° C. for 6 hours. The washcoat load of the second layer amounted to 70 g/l.

The catalyst according to the invention thus obtained is referred to below as K4.

EXAMPLE 5 a) To produce a catalyst according to the invention, catalyst powder A was slurried in water and coated in the usual way along 75% of the total length of a commercial flow substrate starting from one side. It was then dried at 110° C. and calcined at 600° C. for 6 hours. The washcoat load amounted to 280 g/l.

b) Then, catalyst powder C was slurried in water and coated in the usual way along the remaining 25% of the total length of a commercial flow substrate obtained in accordance with the above step a) and coated with catalyst powder A. It was again dried at 110° C. and calcined at 600° C. for 6 hours. The washcoat load of the second layer amounted to 280 g/l.

The catalyst according to the invention thus obtained is referred to below as K5.

EXAMPLE 6

Catalyst powder D was slurried in water and coated in the usual way along the remaining 25% of the total length of a commercial flow substrate obtained in accordance with Example 5a) and coated along 75% of its length with catalyst powder A. It was again dried at 110° C. and calcined at 600° C. for 6 hours. The washcoat load of the second layer amounted to 280 g/l.

The catalyst according to the invention thus obtained is referred to below as K6.

EXAMPLE 7 a) To produce a catalyst according to the invention, catalyst powder B was slurried in water and coated in the usual way along 75% of the total length of a commercial flow substrate starting from one side. It was then dried at 110° C. and calcined at 600° C. for 6 hours. The washcoat load amounted to 280 g/l.

b) Then, catalyst powder C was slurried in water and coated in the usual way along the remaining 25% of the total length of a commercial flow substrate obtained in accordance with the above step a) and coated with catalyst powder A. It was again dried at 110° C. and calcined at 600° C. for 6 hours. The washcoat load of the second layer amounted to 280 g/l.

The catalyst according to the invention thus obtained is referred to below as K7.

EXAMPLE 8

Catalyst powder D was slurried in water and coated in the usual way along the remaining 25% of the total length of a commercial flow substrate obtained in accordance with Example 7a) and coated along 75% of its length with catalyst powder B. It was again dried at 110° C. and calcined at 600° C. for 6 hours. The washcoat load of the second layer amounted to 280 g/l.

The catalyst according to the invention thus obtained is referred to below as K8.

COMPARATIVE EXAMPLE 1

By analogy with example 1a, a commercial flow substrate is coated along its entire length with catalyst powder A in a quantity of 280 g/l.

The catalyst obtained is referred to below as VK1.

COMPARATIVE EXAMPLE 2

By analogy with example 3a, a commercial flow substrate is coated along its entire length with catalyst powder B in a quantity of 280 g/l.

The catalyst obtained is referred to below as VK2.

COMPARATIVE EXAMPLE 3

To produce a comparative catalyst, catalyst powder C was slurried in water and coated in the usual way along the entire length of a commercial flow substrate. It was then dried at 110° C. and calcined at 600° C. for 6 hours. The washcoat load amounted to 280 g/l. The catalyst thus obtained is referred to below as VK3.

COMPARATIVE EXAMPLE 4

To produce a comparative catalyst, catalyst powder D was slurried in water and coated in the usual way along the entire length of a commercial flow substrate. It was then dried at 110° C. and calcined at 600° C. for 6 hours. The washcoat load amounted to 280 g/l. The catalyst thus obtained is referred to below as VK4.

Prior to the catalysts being tested in accordance with examples 1 to 8 and comparative examples 1 to 4, they were first hydrothermally aged for 100 hours at 580° C. in a gas atmosphere (10% $O_2$, 10% $H_2O$, remainder $N_2$).

In the case of the layer catalysts from examples 1 to 4, in order to determine the NO-rates of the aged catalyst, drill cores with L=3" and D=1" were tested in a quartz glass reactor between 150 and 540° C. under stationary conditions (GHSV=30000 1/h, synthesis gas composition: 500 ppm NO, 450 ppm $NH_3$ ($\alpha$=xNH$_3$/xNOx=0.9; xNOx=xNO+xNO$_2$, where x denotes concentration in each case), 5% $O_2$, 5% $H_2O$, remainder $N_2$.

The NO rates of the zoned catalysts from examples 5 to 8 were determined analogously, wherein drill cores were used, which exhibit the two zones in the same length ratio as in the originally coated substrate.

The following NO rates in %, standardized to a, were obtained:

| | Temperature [° C.] | | | | | | | | | |
|---|---|---|---|---|---|---|---|---|---|---|
| | 150 | 175 | 200 | 250 | 300 | 350 | 400 | 450 | 500 | 550 |
| K1 | 7 | 18 | 42 | 97 | 100 | 100 | 100 | 99 | 93 | 73 |
| K2 | 6 | 15 | 34 | 90 | 100 | 100 | 100 | 99 | 92 | 64 |
| K3 | 9 | 21 | 44 | 95 | 99 | 100 | 100 | 99 | 90 | 63 |
| K4 | 8 | 19 | 41 | 92 | 98 | 99 | 99 | 97 | 86 | 50 |
| K5 | 7 | 17 | 37 | 90 | 100 | 100 | 100 | 100 | 90 | 64 |
| K6 | 7 | 17 | 37 | 89 | 100 | 100 | 100 | 99 | 89 | 61 |
| K7 | 8 | 18 | 39 | 91 | 100 | 100 | 100 | 99 | 85 | 54 |
| K8 | 7 | 19 | 40 | 92 | 100 | 100 | 100 | 99 | 85 | 52 |
| VK1 | 8 | 21 | 43 | 92 | 99 | 100 | 100 | 96 | 73 | 18 |
| VK2 | 8 | 21 | 44 | 95 | 100 | 100 | 100 | 95 | 66 | -3 |
| VK3 | 4 | 11 | 27 | 78 | 97 | 99 | 99 | 98 | 95 | 84 |
| VK4 | 4 | 9 | 24 | 70 | 93 | 96 | 96 | 96 | 93 | 82 |

EXAMPLES 9 TO 20

To produce additional catalysts according to the invention, the following catalyst powders were used:

E) Catalyst Powder E of the Composition 87.8 wt % $TiO_2$ as carrier, 3.5 wt % $V_2O_5$, 4.5 wt % $WO_3$, and 4.6 wt % $SiO_2$ was produced as follows:

Commercially available titanium dioxide (anatase) in powder form doped with 5 wt % $SiO_2$ was placed in a container. Then, an aqueous solution of ammonium metatungstate and ammonium metavanadate dissolved in oxalic acid was slowly added in the appropriate quantity under constant mixing. The powder thus obtained was dried at 110° C. and then calcined at 600° C. for 6 hours.

F) Catalyst Powder F of the Composition 92.0 wt % $TiO_2$ as carrier, 3.0 wt % $V_2O_5$, and 5 wt % $WO_3$ was produced as follows: Commercially available titanium dioxide (anatase) in powder form was placed in a container. Then, an aqueous solution of ammonium metatungstate and ammonium metavanadate dissolved in oxalic acid was slowly added in the appropriate quantity under constant mixing. The powder thus obtained was dried at 110° C. and then calcined at 600° C. for 6 hours.

G) Catalyst Powder G of the Composition 92.5 wt % $TiO_2$ as carrier, 2.5 wt % $V_2O_5$, and 5 wt % $WO_3$ was produced as follows: Commercially available titanium dioxide (anatase) in powder form was placed in a container. Then, an aqueous solution of ammonium metatungstate and ammonium metavanadate dissolved in oxalic acid was slowly added in the appropriate quantity under constant mixing. The powder thus obtained was dried at 110° C. and then calcined at 600° C. for 6 hours.

H) Catalyst Powder H of the Composition 91.5 wt % $TiO_2$ as carrier, 2.5 wt % $V_2O_5$, 5 wt % $WO_3$, and 1 wt % silver was produced as follows:

Commercially available titanium dioxide (anatase) in powder form was placed in a container. Then, aqueous solutions of ammonium metatungstate and silver acetate and ammonium metavanadate dissolved in oxalic acid were slowly added in the appropriate quantities under constant mixing. The powder thus obtained was dried at 110° C. and then calcined at 600° C. for 6 hours. The powder thus obtained was dried at 110° C. and then calcined at 600° C. for 6 hours.

I) Catalyst Powder I of the Composition 92.0 wt % $TiO_2$ as carrier, 2.5 wt % $V_2O_5$, 5 wt % $WO_3$, and 0.5 wt % MnO was produced as follows:

Commercially available titanium dioxide (anatase) in powder form was placed in a container. Then, aqueous solutions of manganese acetate, ammonium metatungstate, and ammonium metavanadate dissolved in oxalic acid were slowly added in the appropriate quantities under constant mixing. The powder thus obtained was dried at 110° C. and then calcined at 600° C. for 6 hours.

J) Catalyst Powder J of the Composition 74.9 wt % $TiO_2$ as carrier, 4.0 wt % $V_2O_5$, 8.3 wt % $WO_3$, 9.3 wt % $SiO_2$, and 3.5 wt % $Fe_2O_3$ was produced as follows:

Commercially available titanium dioxide (anatase) in powder form doped with 5 wt % $SiO_2$ was placed in a container and intensively mixed with the appropriate quantity of iron vanadate. Then, an aqueous solution of ammonium metatungstate in the appropriate quantity was slowly added under constant mixing. The powder thus obtained was dried at 110° C. and then calcined at 600° C. for 6 hours.

K) Catalyst Powder K of the Composition 88.6 wt % $TiO_2$ as carrier, 1.6 wt % $V_2O_5$, 5.0 wt % $WO_3$, 4.3 wt % $SiO_2$, and 0.5 wt % CuO was produced as follows:

Commercially available titanium dioxide (anatase) in powder form doped with 5 wt % $SiO_2$ was placed in a container. Then, aqueous solutions of ammonium metatungstate and copper acetate, and ammonium metavanadate dissolved in oxalic acid were slowly added in the appropriate quantities under constant mixing. The powder thus obtained was dried at 110° C. and then calcined at 600° C. for 6 hours.

L) Catalyst Powder L of the Composition 87.2 wt % $TiO_2$ as carrier, 1.6 wt % $V_2O_5$, 5.0 wt % $WO_3$, 4.2 wt % $SiO_2$, and 2.0 wt % $Nb_2O_5$ was produced as follows:

Commercially available titanium dioxide (anatase) in powder form doped with 5 wt % $SiO_2$ was placed in a container. Then, aqueous solutions of ammonium metatungstate and ammonium niobium oxalate, and ammonium metavanadate dissolved in oxalic acid were slowly added in the appropriate quantities under constant mixing. The powder thus obtained was dried at 110° C. and then calcined at 600° C. for 6 hours.

M) Catalyst Powder M of the Composition 87.2 wt % $TiO_2$ as carrier, 1.6 wt % $V_2O_5$, 5.0 wt % $WO_3$, 4.2 wt % $SiO_2$, and 2.0 wt % $MoO_3$ was produced as follows:

Commercially available titanium dioxide (anatase) in powder form doped with 5 wt % $SiO_2$ was placed in a container. Then, aqueous solutions of ammonium metatungstate and ammonium molybdate, and ammonium metavanadate dissolved in oxalic acid were slowly added in the appropriate quantities under constant mixing. The powder thus obtained was dried at 110° C. and then calcined at 600° C. for 6 hours.

N) Catalyst Powder N of the Composition 88.8 wt % $TiO_2$ as carrier, 1.5 wt % $V_2O_5$, 5.0 wt % $WO_3$, and 4.7 wt % $SiO_2$ was produced as follows:

Commercially available titanium dioxide (anatase) in powder form doped with 5 wt % $SiO_2$ was placed in a container. Then, an aqueous solution of ammonium metatungstate and ammonium metavanadate dissolved in oxalic acid was slowly added in the appropriate quantity under constant mixing. The powder thus obtained was dried at 110° C. and then calcined at 600° C. for 6 hours.

O) Catalyst Powder O of the Composition 75.8 wt % $TiO_2$ as carrier, 2.1 wt % $V_2O_5$, 8.4 wt % $WO_3$, 9.4 wt % $SiO_2$, and 4.3 wt % $CeO_2$ was produced as follows:

Commercially available titanium dioxide (anatase) in powder form doped with 10 wt % $SiO_2$ and 9 wt % $WO_3$ was placed in a container. Then, aqueous solutions of ammonium metatungstate and cerium acetate, and ammonium metavanadate dissolved in oxalic acid were slowly added in the appropriate quantities under constant mixing. The powder thus obtained was dried at 110° C. and then calcined at 600° C. for 6 hours.

P) Catalyst Powder P of the Composition 65.1 wt % $TiO_2$ as carrier, 3.2 wt % $V_2O_5$, 7.2 wt % $WO_3$, 8.0 wt % $SiO_2$, 2.8 wt % $Fe_2O_3$, and 13.6 wt % $Er_2O_3$ was produced as follows:

Commercially available titanium dioxide (anatase) in powder form doped with 10 wt % $SiO_2$ and 9 wt % $WO_3$ was placed in a container and mixed intensively with the appropriate quantity of iron erbium vanadate. Then, an aqueous solution of ammonium metatungstate in the appropriate quantity was slowly added under constant mixing. The powder thus obtained was dried at 110° C. and then calcined at 600° C. for 6 hours.

Q) Catalyst Powder Q of the Composition 87.7 wt % $TiO_2$ as carrier, 1.6 wt % $V_2O_5$, 5.0 wt % $WO_3$, 4.2 wt % $SiO_2$, and 1.5 wt % $Sb_2O_5$ was produced as follows:

Commercially available titanium dioxide (anatase) in powder form doped with 5 wt % $SiO_2$ was placed in a container. Then, aqueous solutions of ammonium metatungstate and antimony acetate, and ammonium metavanadate dissolved in oxalic acid were slowly added in the appropriate quantities under constant mixing. The powder thus obtained was dried at 110° C. and then calcined at 600° C. for 6 hours.

Analogously, as described in examples 1 to 4, using catalyst powders E to Q, the layer catalysts according to the invention from examples 9 to 20 were obtained in accordance with the following table.

| Example | Bottom layer (directly on the substrate) | Top layer (on the bottom layer) |
|---|---|---|
| 9 | 120 g/l catalyst powder E | 40 g/l catalyst powder N |
| 10 | 140 g/l catalyst powder E | 20 g/l catalyst powder N |
| 11 | 120 g/l catalyst powder F | 40 g/l catalyst powder N |
| 12 | 120 g/l catalyst powder H | 40 g/l catalyst powder N |
| 13 | 120 g/l catalyst powder E | 40 g/l catalyst powder O |
| 14 | 120 g/l catalyst powder L | 40 g/l catalyst powder N |
| 15 | 120 g/l catalyst powder J | 40 g/l catalyst powder D |
| 16 | 120 g/l catalyst powder E | 40 g/l catalyst powder P |
| 17 | 120 g/l catalyst powder I | 40 g/l catalyst powder N |
| 18 | 120 g/l catalyst powder K | 40 g/l catalyst powder N |
| 19 | 120 g/l catalyst powder M | 40 g/l catalyst powder N |
| 20 | 120 g/l catalyst powder Q | 40 g/l catalyst powder N |

To produce comparative examples 5 to 12, a quantity of 160 g/l of catalyst powder E, N, F, H, O, P, I, or K was coated along the entire length of a commercially available flow substrate. The catalysts thus obtained are hereafter referred to as follows:

VK5 (containing catalyst powder E),
VK6 (containing catalyst powder N),
VK7 (containing catalyst powder F) and
VK8 (containing catalyst powder H)
VK9 (containing catalyst powder O)
VK10 (containing catalyst powder P)
VK11 (containing catalyst powder I)
VK12 (containing catalyst powder K)

The NO rates of the fresh catalysts in accordance with examples 10, 11, 12, 13, 16, 17, and 18 (referred to below as K10, K11, K12, K13, K16, K17, and K18) and comparative catalysts VK5 to VK12 were determined as described above. The following NO rates in %, standardized to a, were obtained:

R) Catalyst Powder R of the Composition 77.1 wt % $TiO_2$ as carrier, 3.61 wt % $V_2O_5$, 11.17 wt % $WO_3$, and 8.12 wt % $SiO_2$ was produced as follows:

A mixture of 11.29 wt % of a pure, commercially available titanium dioxide (anatase) and 81.23 wt % of a commercially available titanium dioxide (anatase) doped with 10 wt % $SiO_2$ and 9 wt % $WO_3$ was placed in a container. Then, aqueous solutions of ammonium metatungstate (3.86 wt % calculated as $WO_3$) and ammonium metavanadate (3.61 wt % calculated as $V_2O_5$) were slowly added under constant mixing. The powder thus obtained was dried at 110° C. and then calcined at 600° C. for 6 hours.

S) Catalyst Powder S of the Composition 73.02 wt % $TiO_2$ as carrier, 3.42 wt % $V_2O_5$, 15.87 wt % $WO_3$; and 7.69 wt % $SiO_2$ was produced as follows:

A mixture of 10.70 wt % of a pure, commercially available titanium dioxide (anatase) and 76.94 wt % of a commercially available titanium dioxide (anatase) doped with 10 wt % $SiO_2$ and 9 wt % $WO_3$ was placed in a container. Then, aqueous solutions of ammonium metatungstate (8.95 wt % calculated as $WO_3$) and ammonium metavanadate (3.42 wt % calculated as $V_2O_5$) were slowly added under constant mixing. The powder thus obtained was dried at 110° C. and then calcined at 600° C. for 6 hours.

EXAMPLE 21 a) To produce a catalyst according to the invention, catalyst powder S was slurried in water and coated in the usual way starting from one side along a length of 1.2" of a commercial flow substrate having a length of 3.0", i.e., 40% of its total length. It was then dried at 110° C. and calcined at 600° C. for 6 hours. The washcoat load amounted to 160 g/l.

b) Then, catalyst powder R was slurried in water and coated in the usual way along the remaining 60% of the total length of the flow substrate obtained in accordance with the above step (a) and coated with catalyst powder S. It was again dried at 110° C. and calcined at 600° C. for 6 hours. The washcoat load of the second layer likewise amounted to 160 g/l.

The catalyst according to the invention thus obtained is referred to below as K13.

COMPARATIVE EXAMPLE 13 a) To produce a comparative catalyst, catalyst powder R was slurried in water and coated in the usual way starting

| | Temperature [° C.] | | | | | | | | | |
|---|---|---|---|---|---|---|---|---|---|---|
| | 150 | 175 | 200 | 250 | 300 | 350 | 400 | 450 | 500 | 540 |
| K10 | 4 | 10 | 23 | 71 | 97 | 99 | 99 | 98 | 93 | 76 |
| K11 | 4 | 11 | 26 | 79 | 100 | 100 | 100 | 100 | 95 | 75 |
| K12 | 2 | 6 | 15 | 54 | 92 | 98 | 97 | 95 | 86 | 56 |
| K13 | 5 | 14 | 32 | 78 | 89 | 90 | 90 | 89 | 84 | 65 |
| K16 | 7 | 17 | 38 | 89 | 99 | 100 | 100 | 98 | 93 | 69 |
| K17 | 3 | 8 | 20 | 68 | 98 | 100 | 100 | 99 | 95 | 75 |
| K18 | 2 | 3 | 8 | 37 | 84 | 96 | 97 | 98 | 95 | 82 |
| VK5 | 6 | 16 | 35 | 86 | 99 | 100 | 100 | 98 | 88 | 58 |
| VK6 | 2 | 3 | 8 | 34 | 81 | 98 | 99 | 99 | 97 | 90 |
| VK7 | 7 | 16 | 36 | 89 | 99 | 99 | 99 | 97 | 86 | 50 |
| VK8 | 3 | 7 | 18 | 57 | 90 | 96 | 95 | 90 | 73 | 23 |
| VK9 | 2 | 6 | 15 | 53 | 91 | 98 | 99 | 98 | 95 | 78 |
| VK10 | 1 | 4 | 10 | 41 | 83 | 97 | 98 | 97 | 92 | 71 |
| VK11 | 3 | 7 | 17 | 61 | 95 | 99 | 99 | 98 | 94 | 73 |
| VK12 | 2 | 4 | 10 | 41 | 85 | 97 | 98 | 98 | 89 | 62 | from one side along a length of 1.2" of a commercial flow substrate having a length of 3.0", i.e., 40% of its total length. It was then dried at 110° C. and calcined at 600° C. for 6 hours. The washcoat load amounted to 160 g/l.

b) Then, catalyst powder S was slurried in water and coated in the usual way along the remaining 60% of the total length of the flow substrate obtained in accordance with the above step (a) and coated with catalyst powder R. It was again dried at 110° C. and calcined at 600° C. for 6 hours. The washcoat load of the second layer likewise amounted to 160 g/l.

The catalyst thus obtained is referred to below as VK13.

In VK13, the proportion of $V_2O_5$ in layer A (the layer produced in step (a)) in wt % with respect to the total weight of layer A is smaller than the proportion of $V_2O_5$ in layer B (the layer produced in step (b)) in wt % with respect to the total weight of layer B. In this respect, VK13 corresponds to example 2 of US 2013/205743.

The NO rates of fresh catalysts K13 and VK13 were determined as described above. The following NO rates in %, standardized to a, were obtained:

| | Temperature [° C.] | | | | | | | | | |
|---|---|---|---|---|---|---|---|---|---|---|
| | 150 | 175 | 200 | 250 | 300 | 350 | 400 | 450 | 500 | 540 |
| K13 | 6 | 16 | 38 | 94 | 99 | 99 | 99 | 98 | 90 | 62 |
| VK13 | 6 | 15 | 35 | 93 | 100 | 100 | 100 | 98 | 85 | 44 |

The invention claimed is:

1. A catalyst for the selective reduction of nitrogen oxides comprising two catalytically active layers A and B, wherein
   A contains a carrier oxide and the components A1 and A2, and
   B contains a carrier oxide and the components B1, B2, and B3,
   wherein
   A1 and B1 stand for at least one oxide of vanadium,
   A2 and B2 for at least one oxide of tungsten, and
   B3 for at least one oxide of silicon,
   characterized in that
      the proportion of component A1 in layer A in wt % with respect to the total weight of layer A is greater than the proportion of component B1 in layer B in wt % with respect to the total weight of layer B, and
      the proportion of layer A in wt % with respect to the total weight of layers A and B is greater than the proportion of layer B, and wherein layers A and B are applied to a catalytically inert supporting body made from ceramic or metallic material having a first end a, a second end b, and a length L, which extends between the ends a and b, and such that layer B covers over layer A such that layer B is exposed to exhaust gas before layer A.

2. The catalyst according to claim 1, characterized in that layer A, in addition to components A1 and A2, contains a component A3, wherein A3 stands for at least one oxide of silicon, and wherein the proportion of component A3 in layer A in wt % with respect to the total weight of layer A is smaller than the proportion of component B3 in layer B in wt % with respect to the total weight of layer B.

3. The catalyst according to claim 1, characterized in that it comprises at least two catalytically active layers A and B, wherein
   A contains a carrier oxide, vanadium pentoxide as component A1, and tungsten trioxide as component A2, and
   B contains a carrier oxide, vanadium pentoxide as component B1, tungsten trioxide as component B2, and silicon dioxide as component B3,
   characterized in that
      the proportion of vanadium pentoxide in layer A in wt % with respect to the total weight of layer A is greater than the proportion of vanadium pentoxide in layer B in wt % with respect to the total weight of layer B, and
      the proportion of layer A in wt % with respect to the total weight of layers A and B is greater than the proportion of layer B.

4. The catalyst according to claim 1, characterized in that the proportion of component A2 in layer A and component B2 in layer B in wt % respectively with respect to the total weight of layer A or B is equal, or the proportion of component A2 in layer A in wt % with respect to the total weight of layer A is smaller than the proportion of component B2 in layer B in wt % with respect to the total weight of layer B.

5. The catalyst according to claim 1, characterized in that the proportion of component A1 calculated as vanadium pentoxide amounts to 1.5 to 5 wt % with respect to the total weight of layer A.

6. The catalyst according to claim 1, characterized in that the proportion of component B1 calculated as vanadium pentoxide amounts to 1 to 4 wt % with respect to the total weight of layer B.

7. The catalyst according to claim 1, characterized in that the proportion of component A2 with respect to the total weight of layer A and the proportion of component B2 with respect to the total weight of layer B are equal and, calculated as tungsten trioxide, amounts to 3 to 12 wt %.

8. The catalyst according to claim 1, characterized in that the proportion of component A2 with respect to the total weight of layer A is smaller than the proportion of component B2 with respect to the total weight of layer B and, calculated as tungsten trioxide, amounts to 3 to 5.5 wt %, wherein the proportion of component B2 with respect to the total weight of layer B amounts to 4.5 to 12 wt %.

9. The catalyst according to claim 1, characterized in that the proportion of component B3 with respect to the total weight of layer B and calculated as silicon dioxide amounts to 3 to 12 wt %.

10. The catalyst according to claim 1, characterized in that the proportion of component A3 with respect to the total weight of layer A and calculated as silicon dioxide amounts to 0 to 5 wt %.

11. The catalyst according to claim 1, characterized in that
   the proportion of component A1 calculated as vanadium pentoxide amounts to 1.5 to 5 wt % with respect to the total weight of layer A, and
   the proportion of component B1 calculated as vanadium pentoxide amounts to 1 to 4 wt % with respect to the total weight of layer B, and
   the proportion of component A2 with respect to the total weight of layer A and the proportion of component B2 with respect to the total weight of layer B are equal and, calculated as tungsten trioxide, amount to 3 to 12 wt %, or the proportion of component A2 with respect to the total weight of layer A is smaller than the proportion of component B2 with respect to the total weight of layer B and, calculated as tungsten trioxide, amounts to 3 to 5.5 wt %, wherein the proportion of component B2 with respect to the total weight of layer B amounts to 4.5 to 12 wt %, and the proportion of component B3 with respect to the total weight of layer B and calculated as silicon dioxide amounts to 3 to 12 wt %, wherein component A3 is not present, or its proportion with respect to the total weight of layer A and calculated as silicon dioxide amounts to 1 to 5 wt %.

12. The catalyst according to claim 1, characterized in that the proportion of component A1 calculated as vanadium pentoxide amounts to 2 to 4 wt % with respect to the total weight of layer A, and the proportion of component B1 calculated as vanadium pentoxide amounts to 1.5 to 3.5 wt % with respect to the total weight of layer B, and the proportion of component A2 with respect to the total weight of layer A and the proportion of component B2 with respect to the total weight of layer B are equal and, calculated as tungsten trioxide, amount to 4.5 to 10 wt %, or the proportion of component A2 with respect to the total weight of layer A is smaller than the proportion of component B2 with respect to the total weight of layer B and, calculated as tungsten trioxide, amounts to 4.5 to 5 wt %, wherein the proportion of component B2, with respect to the total weight of layer B, amounts to 5 to 10 wt %, and the proportion of component B3 with respect to the total weight of layer B and calculated as silicon dioxide amounts to 3.5 to 10 wt %, wherein component A3 is not present, or its proportion with respect to the total weight of layer A and calculated as silicon dioxide amounts to 1 to 5 wt %.

13. The catalyst according to claim 1, characterized in that layer A further comprises component A4, or layer B further comprises component B4, or each of layers A and B further comprise A4 and B4, respectively, wherein A4 stands for one or more metal oxides which are selected from the series consisting of oxides of copper, iron, manganese, molybdenum, antimony, niobium, silver, palladium, platinum, and rare earth elements, and B4, independently of A4, stands for one or more metal oxides which are selected from the series consisting of oxides of copper, iron, manganese, molybdenum, antimony, niobium, silver, and rare earth elements.

14. The catalyst according to claim 13, characterized in that the proportion of component A4 with respect to the total weight of layer A amounts to 0.1 to 15 wt %, wherein, in the case of silver, platinum and palladium, the proportion is calculated as metal in each case, and in the case of the remaining components, the proportion is calculated as oxides in each case, namely, as $CuO$, $Fe_2O_3$, $MnO$, $MoO_3$, $Sb_2O_5$, $Nb_2O_5$, $CeO_2$, or $Er_2O_3$.

15. The catalyst according to claim 1, characterized in that the carrier oxide in layer A and/or B contains titanium dioxide, zirconium dioxide, aluminum oxide, or mixtures thereof.

16. The catalyst according to claim 1, characterized in that the carrier oxide in layer A and B is titanium dioxide.

17. The catalyst according to claim 1, characterized in that the catalytically inert supporting body is a flow honeycomb body or a wall flow filter.

18. The catalyst according to claim 1, wherein the catalytically inert supporting body is a wall flow filter.

19. The catalyst according to claim 1, wherein the catalytically inert supporting body is a flow honeycomb body or a wall flow filter, and layer A is applied directly to the flow honeycomb body or the wall flow filter along its entire length, and layer B is applied to layer A and completely covers it on the exhaust gas side.

20. A method for the reduction of nitrogen oxides in exhaust gases of lean-burn internal combustion engines comprising the method steps of adding a reducing agent to the exhaust gas containing nitrogen oxides, and passing the resulting mixture of exhaust gas containing nitrogen oxides and reducing agent over a catalyst according to claim 1, wherein the catalyst is arranged such that the mixture of exhaust gas containing nitrogen oxides and reducing agent comes into contact with layer B first.

21. An exhaust gas cleaning system for the reduction of nitrogen oxides in exhaust gases of lean-burn internal combustion engines which, in the direction of flow of the exhaust gas, comprises an oxidation catalyst, a diesel particle filter, and a catalyst for the selective reduction of nitrogen oxides (SCR catalyst) according to claim 1, wherein the SCR catalyst is arranged such that the exhaust gas containing nitrogen oxides comes into contact with layer B first.

22. A method for the reduction of nitrogen oxides in exhaust gases of lean-burn internal combustion engines, characterized in that the exhaust gas is channeled through an exhaust gas cleaning system according to claim 21.

23. An exhaust gas cleaning system for the reduction of nitrogen oxides in exhaust gases of lean-burn internal combustion engines which, in the direction of flow of the exhaust gas, comprises an oxidation catalyst and a diesel particle filter on which an SCR catalyst according to claim 1 is present as a coating, wherein the SCR catalyst coating is arranged such that the exhaust gas containing nitrogen oxides comes into contact with layer B first.

24. A method for the reduction of nitrogen oxides in exhaust gases of lean-burn internal combustion engines, characterized in that the exhaust gas is channeled through an exhaust gas cleaning system according to claim 23.

25. A catalyst for the selective reduction of nitrogen oxides comprising two catalytically active layers A and B, wherein A contains a carrier oxide and the components A1 and A2, and B contains a carrier oxide and the components B1, B2, and B3, wherein A1 and B1 stand for at least one oxide of vanadium, A2 and B2 for at least one oxide of tungsten, and B3 for at least one oxide of silicon, characterized in that the proportion of component A1 in layer A in wt % with respect to the total weight of layer A is greater than the proportion of component B1 in layer B in wt % with respect to the total weight of layer B, and the proportion of layer A in wt % with respect to the total weight of layers A and B is greater than the proportion of layer B, and wherein layers A and B are applied to a catalytically inert supporting body made from ceramic or metallic material having a first end a, a second end b, and a length L, which extends between the ends a and b, and characterized in that layer A is applied directly to the inert supporting body along its entire length, and layer B is applied to layer A and completely covers it on the exhaust gas side.

26. The catalyst according to claim 25, characterized in that layer A, in addition to components A1 and A2, contains a component A3, wherein A3 stands for at least one oxide of silicon, and wherein the proportion of component A3 in layer A in wt % with respect to the total weight of layer A is smaller than the proportion of component B3 in layer B in wt % with respect to the total weight of layer B.

27. A catalyst for the selective reduction of nitrogen oxides comprising two catalytically active layers A and B, wherein A contains a carrier oxide and the components A1 and A2, and B contains a carrier oxide and the components B1, B2, and B3, wherein A1 and B1 stand for at least one oxide of vanadium, A2 and B2 for at least one oxide of tungsten, and B3 for at least one oxide of silicon, characterized in that the proportion of component A1 in layer A in wt % with respect to the total weight of layer A is greater than the proportion of component B1 in layer B in wt % with respect to the total weight of layer B, and the proportion of layer A in wt % with respect to the total weight of layers A and B is greater than the proportion of layer B, and wherein layer A is formed as an extruded carrier to which layer B is applied in the form of a coating.

* * * * *